US012049271B1

(12) United States Patent
Saito et al.

(10) Patent No.: US 12,049,271 B1
(45) Date of Patent: Jul. 30, 2024

(54) VEHICLE CONTROL METHOD AND VEHICLE CONTROL DEVICE

(71) Applicant: Nissan Motor Co., Ltd., Yokohama (JP)

(72) Inventors: Shinya Saito, Kanagawa (JP); Daisuke Takei, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/567,073

(22) PCT Filed: Jun. 11, 2021

(86) PCT No.: PCT/JP2021/022404
§ 371 (c)(1),
(2) Date: Dec. 5, 2023

(87) PCT Pub. No.: WO2022/259552
PCT Pub. Date: Dec. 15, 2022

(51) Int. Cl.
*B62D 6/00* (2006.01)
*B60W 40/076* (2012.01)
*B60W 60/00* (2020.01)

(52) U.S. Cl.
CPC ........... *B62D 6/002* (2013.01); *B60W 40/076* (2013.01); *B60W 60/001* (2020.02)

(58) Field of Classification Search
CPC .............................. B62D 6/002; B60W 40/076
See application file for complete search history.

(56) References Cited

U.S. PATENT DOCUMENTS

| 2014/0180543 | A1 | 6/2014 | Ueda et al. | |
| 2016/0096546 | A1* | 4/2016 | Chia | B62D 15/025 |
| | | | | 701/41 |
| 2018/0186371 | A1* | 7/2018 | Sterniak | B62D 5/04 |
| 2019/0232965 | A1* | 8/2019 | Watanabe | B60T 7/12 |
| 2021/0003410 | A1 | 1/2021 | Takeuchi et al. | |
| 2022/0306114 | A1* | 9/2022 | Kunihiro | B60W 30/12 |

FOREIGN PATENT DOCUMENTS

| JP | 2008-033807 A | 2/2008 |
| JP | 2014-139063 A | 7/2014 |
| JP | 2018-154304 A | 10/2018 |
| JP | 2020-040524 A | 3/2020 |
| JP | 2020-506837 A | 3/2020 |
| WO | 2019/186617 A1 | 10/2019 |

* cited by examiner

*Primary Examiner* — Khoi H Tran
*Assistant Examiner* — Tristan J Greiner
(74) *Attorney, Agent, or Firm* — Young Basile Hanlon & MacFarlane, P.C.

(57) ABSTRACT

A vehicle control device includes: a steering angle calculating unit configured to calculate a target steering angle of a steering wheel of a subject vehicle such that the subject vehicle follows a travel trajectory for a lane change; a steering angle correcting unit configured to correct the target steering angle based on a subject-lane slope representing a slope of a road surface in a width direction of a subject lane in which the subject vehicle is traveling and an adjacent-lane slope representing a slope of a road surface in a width direction of an adjacent lane being a lane change destination of the subject vehicle; and a steering control unit configured to perform steering control such that a steering angle of the steering wheel follows the corrected target steering angle.

6 Claims, 4 Drawing Sheets

VEHICLE CONTROL METHOD AND VEHICLE CONTROL DEVICE

TECHNICAL FIELD

The present invention relates to a vehicle control method and a vehicle control device.

BACKGROUND

There has been known a technology of: calculating a target steering angle for a subject vehicle to travel along a target traveling line through addition of a feedforward control term, a feedback control term, and an integral control term; and performing steering support control to apply a steering torque to a steering mechanism such that a steering angle of the subject vehicle follows the target steering angle (JP 2020-040524 A.

The technology of JP 2020-040524 A determines whether or not a road surface on which the subject vehicle is traveling has been switched from a non-cant road surface with no lateral inclination to a cant road surface with a lateral inclination based on an amount of change per unit time of a cant index value which represents a degree of the lateral inclination of the road surface on which the subject vehicle is traveling, and when determining that the road surface has been switched, sets a control gain of the integral control term to a value higher than a normal value.

SUMMARY

In the technology of JP 2020-040524 A, when it is determined that the road surface on which the subject vehicle is traveling has been switched to the cant road surface based on the cant index value of the road surface on which the subject vehicle is actually traveling, the steering assist control suited to a change in a slope in a lateral direction of the road surface for a travel is executed. Accordingly, in the technology of JP 2020-040524 A, in a scene in which the vehicle changes lanes from a subject lane to an adjacent lane which differs from the subject lane in a slope in the width direction, the steering assist control suited to the change in a slope in the width direction from the subject lane to the adjacent lane is delayed. Thus, there is a problem in that lateral deviation with respect to a target travel trajectory of the subject vehicle is caused due to the change in a slope between lanes.

An object to be achieved by the present invention is to provide a vehicle control method and a vehicle control device capable of suppressing, even when a slope in a width direction differs between a subject lane and an adjacent lane being a lane change destination, lateral deviation with respect to a target travel trajectory of a subject vehicle, which is caused due to a change in a slope between lanes during a lane change.

The present invention achieves the above-mentioned problems by: calculating a target steering angle of a steering wheel of a subject vehicle such that the subject vehicle travels along a target travel trajectory for a lane change; correcting the target steering angle based on a subject-lane slope representing a slope of a road surface in a width direction of a subject lane in which the subject vehicle is traveling and an adjacent-lane slope representing a slope of a road surface in a width direction of an adjacent lane being a lane change destination of the subject vehicle; and performing steering control such that a steering angle of the steering wheel follows the corrected target steering angle.

According to the present invention, even when the slope in the width direction differs between the subject lane and the adjacent lane being the lane change destination, it is possible to suppress the lateral deviation with respect to the target travel trajectory of the subject vehicle, which is caused due to the change in the slope between lanes during the lane change.

DETAILED DESCRIPTION

Figure 1:
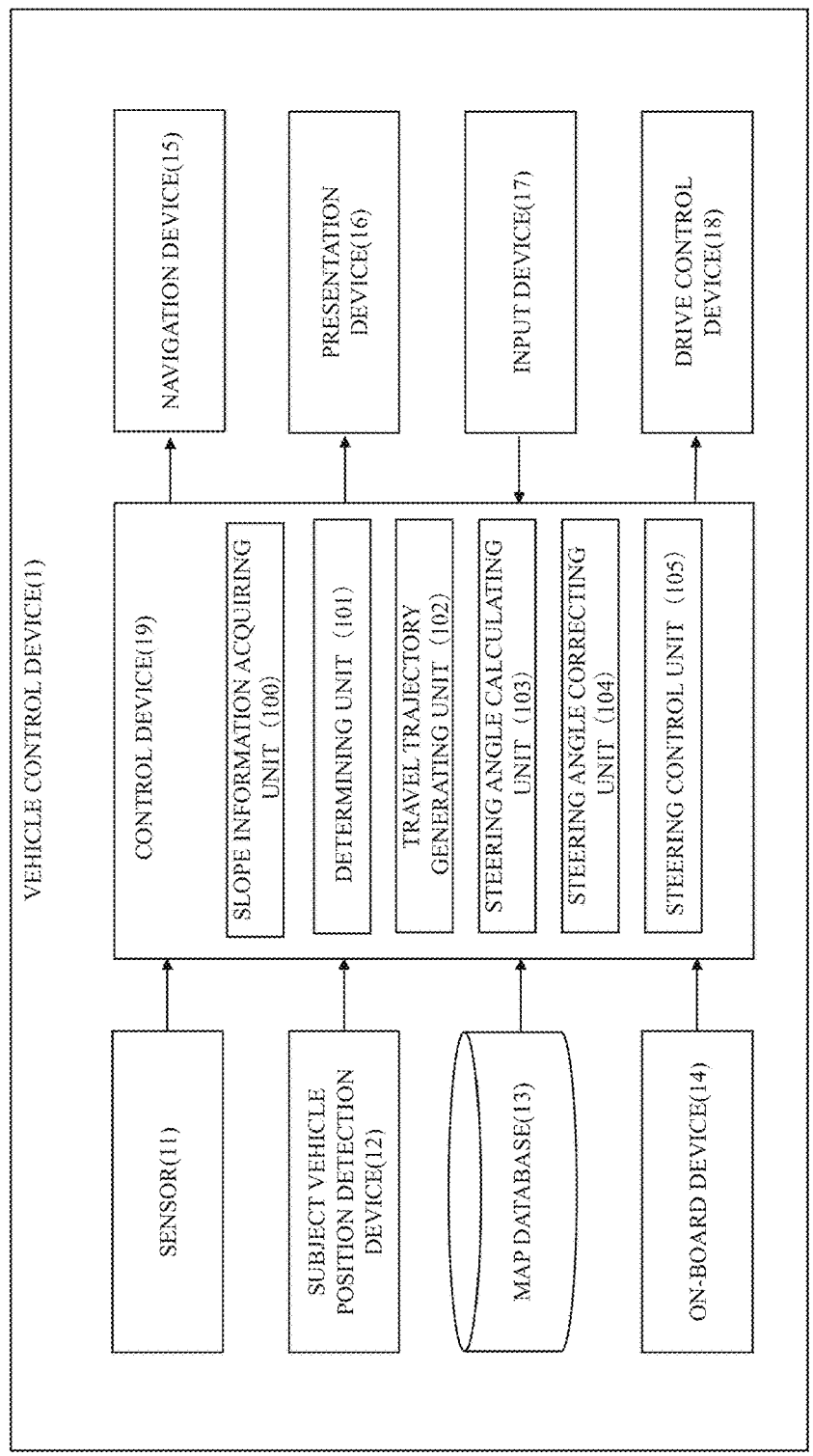
FIG. 1 is a block diagram illustrating a vehicle control device of a vehicle according to one embodiment of the present invention.

FIG. 1 is a block diagram illustrating a configuration of a vehicle control device 1 of a vehicle (hereinafter, also referred to as a subject vehicle) according to this embodiment. The vehicle control device 1 according to this embodiment is one embodiment for carrying out a vehicle control method according to the present invention. As illustrated in FIG. 1, the vehicle control device 1 according to this embodiment includes a sensor 11, a subject vehicle position detection device 12, a map database 13, an on-board device 14, a navigation device 15, a presentation device 16, an input device 17, a drive control device 18, and a control device 19. These devices are connected to each other through, for example, a controller area network (CAN) or other in-vehicle LAN so as to mutually send and receive information. In this embodiment, as long as the vehicle control device 1 includes at least the control device 19, the other configuration is not limited to the above-mentioned configuration. For example, the map database 13 is not limited to being stored in the vehicle control device 1. The map database 13 may be a database provided outside the vehicle control device 1.

The sensor 11 detects an environment around the subject vehicle. For example, the sensor 11 includes cameras such as a front camera which captures a front field of the subject vehicle, a back camera which captures a back field of the subject vehicle, and a side camera which captures a right side field or a left side field of the subject vehicle. In this embodiment, the sensor 11 recognizes, through image recognition, a lane boundary line and the like from images captured by the cameras. The lane boundary line includes a white line, a yellow line, a broken line, a double line, and the like.

Further, the sensor 11 includes radars such as a front radar which detects obstacles ahead of the subject vehicle, a back radar which detects obstacles behind the subject vehicle, and a side radar which detects obstacles existing on a right side or a left side of the subject vehicle. The sensor 11 outputs detection results relating to an environment around the subject vehicle to the control device 19 as ambient environment information at predetermined time intervals.

In addition, the sensor 11 detects a traveling state of the subject vehicle. For example, the sensor 11 includes a vehicle speed sensor which detects vehicle speed of the subject vehicle. The sensor 11 includes a steering angle sensor which detects a steering angle of a steering wheel. In this embodiment, the steering angle sensor outputs, with respect to a neutral position of the steering wheel, a positive value for the steering angle when steering to the right with respect to a traveling direction of the subject vehicle, and a negative value for the steering angle when steering to the left with respect to the traveling direction of the subject vehicle. The neutral position is a reference position where the steering angle is zero and is a position of the steering wheel when the subject vehicle travels straight. The output of the steering angle sensor is not limited to the above. The steering angle sensor may output a negative value for the steering angle when steering to the right with respect to the traveling direction of the subject vehicle, and a positive value for the steering angle when steering to the left with respect to the traveling direction of the subject vehicle.

Further, the sensor 11 includes a distance sensor which acquires a distance to an object. The distance sensor includes a laser sensor, a depth camera, and the like. The sensor 11 includes a yaw rate sensor which acquires a yaw rate around the center of gravity axis of the subject vehicle. The yaw rate sensor acquires a yaw rate which is caused when the subject vehicle turns. The sensor 11 includes a lateral acceleration sensor which detects lateral acceleration of the vehicle. In this embodiment, the sensor 11 recognizes a lane boundary line from images of an outside of the vehicle captured by the side camera, etc., and measures a criterion distance which is a distance between the subject vehicle and the lane boundary line. The sensor 11 outputs the detection results relating to the traveling state of the subject vehicle to the control device 19 as traveling information at predetermined time intervals. The sensor 11 may be configured using one of the plurality of sensors described above or may be configured using a combination of two or more kinds of the sensors.

The subject vehicle position detection device 12 includes a GPS unit, a gyro-sensor, a vehicle speed sensor, and the like. The subject vehicle position detection device 12 detects, by the GPS unit, radio waves transmitted from a plurality of communication satellites to periodically acquire positional information of a target vehicle (subject vehicle). Further, the subject vehicle position detection device 12 detects a current position of the target vehicle based on the acquired positional information of the target vehicle, angle variation information acquired from the gyro-sensor, and the vehicle speed acquired from the vehicle speed sensor. The subject vehicle position detection device 12 outputs the detected positional information of the target vehicle to the control device 19 at predetermined time intervals.

The map database 13 is a database which stores map information including road information. The map database 13 is stored in a memory which is accessible from the control device 19. In the road information, each point on the map, such as an intersection or a junction, is stored as a node, and a road section between nodes is stored as a road link. The road information includes road link information of each road link. The road link consists of one or a plurality of lanes, and a traffic direction is set for each lane. The road link information includes information on, for example, a road type, a width, the number of lanes, a curve path, and a size of the curve path (for example, curvature or curvature radius) of the road link. Further, the road link information includes slope information. The slope information includes at least information relating to a slope of a road surface in a width direction of a lane, specifically, information indicating a magnitude of the slope of the road surface in the width direction of the lane and an orientation of the slope. The magnitude of the slope is, for example, a value obtained by dividing a height difference between a left end and a right end of a lane in the width direction of the lane by a width of the lane. The magnitude of the slope is expressed by a percentage (%). The orientation of the slope represents, for example, a leftward slope when the right end of the lane is higher than the left end of the lane in the width direction of the lane, and a rightward slope when the left end of the lane is higher than the right end of the lane in the width direction of the lane. The slope information may be, for example, an average slope in the width direction of the lane. When the road link has two or more lanes, the slope information in the road link includes information relating to the slope of the road surface in the width direction of the lane for each lane. The slope of the road surface in the width direction of the lane includes, for example, a cant formed in a curve.

The on-board device 14 includes various kinds of devices mounted in the vehicle and is operated through manipulation of a driver. Examples of the on-board device include a steering wheel, an accelerator pedal, a brake pedal, direction indicators, wipers, lights, a horn, and other specific switches. When the on-board device 14 is manipulated by a driver, the on-board device 14 outputs the manipulation information to the control device 19.

The navigation device 15 acquires current positional information of the subject vehicle from the subject vehicle position detection device 12, and the navigation device 15 superposes the position of the subject vehicle on map information for navigation to display the position of the subject vehicle and the map information on a display or the like. Further, the navigation device 15 has a navigation function of setting a route to a destination and guiding the set route to a driver when the destination is set. This navigation function serves to display the route on the map in the display and inform a driver of the route by voice or the like.

The presentation device 16 includes, for example, various kinds of displays such as a display of the navigation device 15, a display incorporated in a rearview mirror, a display incorporated in a meter unit, and a head-up display projected on a windshield. Further, the presentation device 16 includes one or more devises other than the displays, such as a speaker of an audio device and a seat device with embedded vibrating bodies. The presentation device 16 informs a driver of various items of presentation information under control by the control device 19.

The input device 17 is, for example, a device such as a button switch with which a driver can input information through manual operation of the driver, a touch panel disposed on a display screen, or a microphone with which the driver can input information by voice of the driver. In this embodiment, a driver can operate the input device 17, thereby inputting setting information in response to the presentation information presented by the presentation device 16. The input device 17 includes a switch which is to be used when a driver sets ON/OFF or the like of an autonomous speed control function and an autonomous steering control function of the control device 19. For example, the switch for the autonomous steering control function includes a lane change switch for executing a lane change control function. The lane change switch is a button switch for a driver to instruct (approve) the start of the lane change when the control device 19 confirms to a driver that the lane change is to start. After the driver has approved the start of the lane change, the driver can cancel the approval of the lane change proposed by the control device 19 by operating the lane change switch for longer than a predetermined time period.

A direction indicator lever for direction indicators or a switch of other on-board device 14 may be used as the input device 17. For example, in a case in which the control device 19 proposes to a driver whether or not to automatically change lanes, when the driver operates the direction indicator lever, the subject vehicle performs the lane change toward a direction in which the direction indicator lever is operated. The input device 17 outputs the input setting information to the control device 19. In this embodiment, the direction in which the subject vehicle changes lanes is not particularly limited. The subject vehicle can change lanes to move to an adjacent lane on the right side of the traveling direction or an adjacent lane on the left side of the traveling direction.

The drive control device 18 controls a travel of the subject vehicle based on a target speed and a target steering angle output from the control device 19. Contents of control to be executed by the drive control device 18 include autonomous speed control and autonomous steering control. Further, the autonomous steering control includes lane keeping control, lane change control, and overtaking control. For example, when the subject vehicle travels at a constant target speed under the autonomous speed control, the drive control device 18 controls operation of a drive mechanism and operation of a brake for keeping acceleration and deceleration, and the traveling speed such that the speed of the subject vehicle becomes the target speed. Further, also when the subject vehicle travels to follow a preceding vehicle under the autonomous speed control, the drive control device 18 similarly controls the operation of the drive mechanism and the brake. The operation control of the drive mechanism includes controlling operation of an internal-combustion engine in a case of an engine car and controlling operation of an electric motor for a travel in a case of an electric car. Further, in a case of a hybrid car, the operation control of the drive mechanism includes controlling torque distribution for an internal-combustion engine and an electric motor for a travel.

Further, the drive control device 18 controls operation of a steering actuator under the autonomous steering control in addition to the above-mentioned controlling the operation of the drive mechanism and the brake, thereby executing steering control of the subject vehicle such that the steering angle of the steering wheel of the subject vehicle follows the target steering angle. For example, when executing the lane keeping control under the autonomous steering control, the drive control device 18 executes the steering control and controls a traveling position (lateral position) of the subject vehicle in a road width direction such that the subject vehicle follows a target travel trajectory along a subject lane. The lateral position of the subject vehicle is a position of the subject vehicle in the width direction of the lane (in the road width direction of the subject vehicle). In this embodiment, the lateral position of the subject vehicle includes a lateral position of the subject vehicle with respect to the lane boundary line, and the lateral position of the subject vehicle with respect to the target travel trajectory. The lateral position of the subject vehicle may be any position in the subject vehicle. For example, the lateral position of the subject vehicle is a position of the center of gravity of the subject vehicle in the width direction of the lane. Further, when executing the lane change under the autonomous steering control, the drive control device 18 executes the steering control and controls the lateral position of the subject vehicle such that the subject vehicle follows the target travel trajectory for a lane change. Further, other known methods can also be used as the vehicle control method to be executed by the drive control device 18.

The control device 19 includes a read only memory (ROM) which stores programs for controlling the travel of the subject vehicle, a central processing unit (CPU) which executes the programs stored in the ROM, a random access memory (RAM) which serves as an accessible storage device, and the like. As a substitute for or in addition to the CPU, a micro processing unit (MPU), a digital signal processor (DSP), an application specific integrated circuit (ASIC), a field programmable gate array (FPGA), or the like can be used as an operation circuit. The control device 19 controls the travel of the subject vehicle using the autonomous speed control function and the autonomous steering control function. The autonomous steering control function includes, for example, a lane keeping function, a lane change function, and an overtaking function. The control device 19 executes each of the above-mentioned functions by software for realizing each of the functions or executing each processing in cooperation with hardware. The control device 19 generates the target travel trajectory to be followed by the subject vehicle, calculates the target speed and target steering angle for the subject vehicle to travel along the target travel trajectory, and outputs the calculated target speed and target steering angle to the drive control device 18. In this embodiment, the control device 19 executes an autonomous travel of the subject vehicle or driving assist.

In this embodiment, the control device 19 executes steering angle correction control of correcting the target steering angle using the autonomous steering control function. The control device 19 includes, as functional blocks, a slope information acquiring unit 100, a determining unit 101, a travel trajectory generating unit 102, a steering angle calculating unit 103, a steering angle correcting unit 104, and a steering control unit 105. First, the control device 19 acquires a subject-lane slope representing a slope of a road surface in a width direction of the subject lane in which the subject vehicle is traveling and an adjacent-lane slope representing a slope of a road surface in a width direction of an adjacent lane adjacent to the subject lane. Next, the control device 19 determines whether or not a lane change start condition is satisfied. When determining that the lane change start condition is satisfied, the control device 19 generates the target travel trajectory for the lane change and calculates the target steering angle such that the subject vehicle follows the target travel trajectory. The control device 19 corrects the target steering angle based on the subject-lane slope and the adjacent-lane slope. Then, the control device 19 performs the steering control such that the steering angle of the steering wheel follows the corrected target steering angle. In this embodiment, the functions of the control device 19 are divided into six functional blocks, and functions of the respective functional blocks are described. However, the functions of the control device 19 are not necessarily required to be divided into six blocks and may be divided into five or less functional blocks or seven or more functional blocks.

The slope information acquiring unit 100 acquires the slope information of the subject-lane slope and the adjacent-lane slope. With reference to the map database 13, the slope information acquiring unit 100 acquires the subject-lane slope and the adjacent-lane slope within a predetermined distance (for example, 2 km) from the current position of the subject vehicle along the traveling direction. For example, the slope information acquiring unit 100 acquires the subject-lane slope and the adjacent-lane slope at predetermined time intervals during the travel of the vehicle. Further, before the start of the lane change, the slope information acquiring unit 100 acquires the subject-lane slope by considering the lane in which the subject vehicle is traveling as the subject lane. During a stage from the start of the lane change until the end of the lane change, the slope information acquiring unit 100 acquires the subject-lane slope by considering the lane in which the subject vehicle is traveling at the start of the lane change as the subject lane and acquires the adjacent-lane slope by considering the lane being the lane change destination as the adjacent lane. For example, as an example of a situation between the start of the lane change and the end of the lane change, there can be given a situation in which, during the lane change, a vehicle edge of the subject vehicle on a side of the adjacent lane being the lane change destination crosses the lane boundary line, a part of the subject vehicle is located on the adjacent lane, and the other part of the subject vehicle is located on the subject lane. In such a situation, the slope information acquiring unit 100 acquires the subject-lane slope by considering the lane in which the subject vehicle is traveling at the start of the lane change as the subject lane and acquires the adjacent-lane slope by considering the lane being the lane change destination as the adjacent lane. When the lane change has been finished, the slope information acquiring unit 100 acquires the subject-lane slope by considering the adjacent lane being the lane change destination, that is, the lane, which has been considered as the adjacent lane before the lane change, as the subject lane.

The determining unit 101 determines whether or not the lane change start condition is satisfied. For example, based on the ambient environment information of the subject vehicle acquired by the sensor 11 and the positional information of the subject vehicle acquired by the subject vehicle position detection device 12, the determining unit 101 determines whether or not the lane change start condition is satisfied. Specifically, when determining that the adjacent lane has a space allowing the lane change based on the detection results that the obstacles are detected by the sensor 11 on the adjacent lane being the lane change destination, the determining unit 101 determines that the lane change start condition is satisfied. Further, when determining that the position of the subject vehicle has reached a lane change start position set on a route based on the positional information of the subject vehicle detected by the subject vehicle position detection device 12, the determining unit 101 determines that the lane change start condition is satisfied. Further, when acquiring input of an instruction from a driver to start the lane change through the input device 17, the determining unit 101 may determine that the lane change start condition is satisfied. Further, when acquiring the operation information as a result of operation of the direction indicator lever by a driver, the determining unit 101 may determine that the lane change start condition is satisfied.

Further, the determining unit 101 determines whether or not the subject vehicle has started changing lanes. When the subject vehicle has started moving in a lateral direction to change lanes, in other words, when the lateral position of the subject vehicle has been started to move along the target travel trajectory for the lane change, the determining unit 101 determines that the subject vehicle has started changing lanes. For example, when the lateral position of the subject vehicle has been moved by a predetermined distance or more within a predetermined period of time from predetermined determination start timing, the determining unit 101 determines that the subject vehicle has started changing lanes. The predetermined determination start timing is, for example, timing when the determining unit 101 determines that the lane change start condition is satisfied, or timing when the target speed and the target steering angle for the lane change have been output to the drive control device 18.

Further, the determining unit 101 determines whether or not the vehicle edge of the subject vehicle has reached the lane boundary line between the subject lane and the adjacent lane. For example, the determining unit 101 recognizes a position of the lane boundary line by the side camera and the like of the sensor 11 and determines that the vehicle edge of the subject vehicle has reached the lane boundary line when a side surface of the subject vehicle on the side of the adjacent lane being the lane change destination has reached the lane boundary line.

Further, the determining unit 101 determines whether or not the subject vehicle has finished changing lanes. When the lateral position of the subject vehicle has reached a center line in the width direction of the adjacent lane being the lane change destination, the determining unit 101 determines that the subject vehicle has finished the lane change to the adjacent lane. Further, when a side surface of the subject vehicle on a side opposite to the adjacent lane being the lane change destination has reached the lane boundary line between the subject lane and the adjacent lane, the determining unit 101 may determine that the lane change to the adjacent lane has been finished.

The travel trajectory generating unit 102 generates the target travel trajectory for the subject vehicle to travel based on the positional information of the subject vehicle, the map information, the ambient environment information of the subject vehicle, and the traveling information of the subject vehicle. For example, when the drive control device 18 executes the lane keeping control, the travel trajectory generating unit 102 generates the target travel trajectory for the subject vehicle to travel on the center line of the subject lane. Further, when the drive control device 18 executes the lane change control, the travel trajectory generating unit 102 generates the target travel trajectory for the lane change. Specifically, when the determining unit 101 determines that the lane change start condition is satisfied, the travel trajectory generating unit 102 generates the target travel trajectory for the subject vehicle to travel from the current position of the subject vehicle to the center line of the adjacent lane. Further, when the determining unit 101 determines that the lane change has been finished, the travel trajectory generating unit 102 generates the target travel trajectory for the subject vehicle to travel on the center line of the subject lane by considering the adjacent lane being the lane change destination, that is, the lane, which has been considered as the adjacent lane before the lane change, as the subject lane.

The steering angle calculating unit 103 calculates the target steering angle of the steering wheel of the subject vehicle such that the subject vehicle travels along the target travel trajectory. For example, the steering angle calculating unit 103 calculates the target steering angle based on the target travel trajectory and the current position of the subject vehicle (the lateral position of the subject vehicle).

The steering angle correcting unit 104 corrects the target steering angle calculated by the steering angle calculating unit 103. While the subject vehicle is traveling along the subject lane using the lane keeping function, the steering angle correcting unit 104 calculates a steering angle correction amount in accordance with the subject-lane slope and corrects the target steering angle based on the calculated steering angle correction amount. For example, it is conceivable that, as the slope of the road surface in the width direction of the lane increases, a component of gravity in a horizontal direction of the road surface with a larger degree is applied to the vehicle on the inclined road surface while lateral deviation with a larger degree is caused at the lateral position with respect to the target travel trajectory of the subject vehicle. The lateral deviation refers to a difference between the lateral position of the subject vehicle and the target travel trajectory. The steering angle correction amount refers to a correction amount for reducing the lateral deviation caused by the slope of the road surface in the width direction of the lane. Further, whether an orientation of the lateral deviation caused by the slope of the road surface in the width direction of the lane is rightward or leftward with respect to the target travel trajectory is determined depending on the orientation of the slope. For example, when the orientation of the slope in the width direction of the lane is leftward, the lateral deviation oriented leftward with respect to the target travel trajectory is caused at the lateral position of the subject vehicle. Further, when the orientation of the slope in the width direction of the lane is rightward, the lateral deviation oriented rightward with respect to the target travel trajectory is caused at the lateral position of the subject vehicle.

For example, steering angle correction amounts corresponding to the slope of the road surface in the width direction of the lane are preset in a map. The map defines the relationship between the magnitude as well as orientation of the slope of the road surface in the width direction of the lane and the steering angle correction amount. In the map, a quantity (absolute value) of the steering angle correction amount is set in accordance with the magnitude of the slope of the road surface in the width direction of the lane, and whether the steering angle correction amount is a positive value or a negative value is set depending on the orientation of the slope of the road surface in the width direction of the lane. When the orientation of the slope of the road surface in the width direction of the lane is leftward, the steering angle correction amount is set as a positive value. When the orientation of the slope of the road surface in the width direction of the lane is rightward, the steering angle correction amount is set as a negative value. Further, in the map, when the magnitude of the slope of the road surface in the width direction of the lane is zero, the steering angle correction amount is set to zero. The steering angle correcting unit 104 calculates, with reference to the map, the steering angle correction amount in accordance with the subject-lane slope (the magnitude and orientation of the slope of the subject lane). Then, the steering angle correcting unit 104 corrects the target steering angle by adding the calculated steering angle correction amount to the target steering angle. The relationship between the orientation of the slope and positive and negative values of the steering angle correction amounts is an example and does not limit the relationship between the orientation of the slope and positive and negative values of the steering angle correction amounts. For example, in contrast to this embodiment, the steering angle correction amount may be set to a negative value when the orientation of the slope is leftward, and the steering angle correction amount may be set to a positive value when the orientation of the slope is rightward.

Further, the steering angle correcting unit 104 corrects the target steering angle based on the subject-lane slope and the adjacent-lane slope until the vehicle edge of the subject vehicle reaches the lane boundary line after the subject vehicle starts changing lanes. First, from the time when the subject vehicle has started changing lanes, the steering angle correcting unit 104 calculates, at predetermined time intervals, the criterion distance from the subject vehicle to the lane boundary line between the subject lane and the adjacent lane. Specifically, from the time when the subject vehicle starts moving in the lateral direction to change lanes, the steering angle correcting unit 104 calculates, at predetermined time intervals, the criterion distance from the images of the outside of the vehicle captured by the side camera of the sensor 11. The criterion distance is, for example, a distance between the lane boundary line and the side surface of the subject vehicle on the side of the adjacent lane being the lane change destination. The criterion distance may be a distance between the lane boundary line and the center of gravity of the subject vehicle.

Next, the steering angle correcting unit 104 determines, in accordance with the calculated criterion distance, weighting of the subject-lane slope and weighting of the adjacent-lane slope. For example, the steering angle correcting unit 104 determines weighting of the subject-lane slope as $\alpha$ ($0<\alpha<1$) and weighting of the adjacent-lane slope as $1-\alpha$. A value of $\alpha$ is a value to be determined in accordance with the criterion distance and is set to a smaller value as the criterion distance becomes smaller. That is, as the subject vehicle is closer to the lane boundary line, the steering angle correcting unit 104 sets weighting of the subject-lane slope to a smaller value and sets weighting of the adjacent-lane slope to a larger value. In this embodiment, every time the criterion distance is calculated, the steering angle correcting unit 104 sets, in accordance with the criterion distance, weighting of each of the subject-lane slope and the adjacent-lane slope. Accordingly, as the criterion distance becomes smaller along with approach of the subject vehicle to the lane boundary line, weighting of the subject-lane slope is set to a smaller value, whereas weighting of the adjacent-lane slope is set to a larger value. The steering angle correcting unit 104 calculates a weighted slope ($X_c$) by weighting the subject-lane slope ($X_a$) and the adjacent-lane slope ($X_b$) which are acquired. That is, the weighted slope ($X_c$) is obtained as expressed by Expression (1) below.

[Expression 1]

$$X_c = \alpha X_a + (1-\alpha) X_b \tag{1}$$

Further, the steering angle correcting unit 104 calculates the steering angle correction amount based on the weighted slope. The steering angle correction amount based on the weighted slope is calculated in a method similar to the above-mentioned method of calculating the steering angle correction amount. At this time, an orientation of the weighted slope is set in accordance with the criterion distance. When the subject vehicle is away from the lane boundary line by a predetermined distance or more, priority is given to the steering control suited to the subject-lane slope, and the orientation of the weighted slope is set to the orientation of the subject-lane slope. Further, when the subject vehicle is close to the lane boundary line at a distance smaller than the predetermined distance, priority is given to operation control suited to the adjacent-lane slope, and the orientation of the weighted slope is set to the orientation of the adjacent-lane slope. For example, when the value of $\alpha$ to be determined in accordance with the criterion distance is smaller than 0.5, the steering angle correcting unit 104 sets the orientation of the weighted slope to the same orientation as that of the adjacent-lane slope. When the value of $\alpha$ is equal to or larger than 0.5, the steering angle correcting unit 104 sets the orientation of the weighted slope to the same orientation as that of the subject-lane slope.

For example, when the orientation of the subject-lane slope is rightward and the orientation of the adjacent-lane slope is leftward, the steering angle correcting unit 104 sets the orientation of the weighted slope to the orientation of the slope of the subject lane (rightward orientation) and sets the steering angle correction amount as a negative value until the value of α becomes smaller than 0.5 as the criterion distance decreases. Then, when the value of α becomes smaller than 0.5, the steering angle correcting unit 104 sets the orientation of the weighted slope to the orientation of the adjacent-lane slope (leftward orientation) and sets the steering angle correction amount as a positive value. When the steering angle correction amount is calculated based on the weighted slope, the steering angle correcting unit 104 corrects the target steering angle by adding the calculated steering angle correction amount to the target steering angle. In this embodiment, while the subject vehicle is traveling in the subject lane, in other words, before the subject vehicle enters the adjacent lane, the target steering angle is calculated, and the steering control is performed using the adjacent-lane slope in addition to the subject-lane slope. In particular, as the subject vehicle approaches the adjacent lane, through weighting processing, the steering angle correction amount can be made closer to the steering angle correction amount for reducing the lateral deviation caused by the adjacent-lane slope. Thus, even when the slope of the road surface in the width direction differs between the subject lane and the adjacent lane, the steering control suited to the adjacent-lane slope can be performed.

In this embodiment, weighting is not limited to weighting of the slope of the road surface in the width direction of the lane. The steering angle correction amount may be weighted after the steering angle correction amount is calculated based on the slope of the road surface in the width direction of the lane. First, the steering angle correcting unit 104 calculates the steering angle correction amount based on the subject-lane slope and the steering angle correction amount based on the adjacent-lane slope. Next, the steering angle correcting unit 104 executes the weighting processing to weight the steering angle correction amount based on the subject-lane slope and the steering angle correction amount based on the adjacent-lane slope in accordance with the criterion distance. Then, the steering angle correcting unit 104 corrects the target steering angle by adding the steering angle correction amount based on the weighted subject-lane slope and the steering angle correction amount based on the weighted adjacent-lane slope to the target steering angle.

Further, the steering angle correcting unit 104 corrects the target steering angle based on the adjacent-lane slope when the determining unit 101 determines that the vehicle edge of the subject vehicle has reached the lane boundary line. The steering angle correction amount based on the adjacent-lane slope is calculated in a method similar to the above-mentioned method of calculating the steering angle correction amount. The steering angle correcting unit 104 corrects the target steering angle by adding the calculated steering angle correction amount to the target steering angle. Further, the method of correcting the target steering angle is not limited to the above-mentioned method. For example, the steering angle correcting unit 104 may correct the target steering angle based on the subject-lane slope and the adjacent-lane slope from the time when the determining unit 101 determines that the vehicle edge of the subject vehicle has reached the lane boundary line until the determining unit 101 determines that the subject vehicle has finished changing lanes. That is, unlike the above-mentioned method, the slope information to be used to correct the target steering angle does not always need to be changed in accordance with the position of the subject vehicle.

Further, when the determining unit 101 determines that the subject vehicle has finished changing lanes, the steering angle correcting unit 104 acquires the subject-lane slope by considering the lane which has been considered as the adjacent lane before the lane change, that is, the lane in which the subject vehicle is traveling after the lane change, as the subject lane, and corrects the target steering angle based on the acquired subject-lane slope. In this embodiment, when the determining unit 101 determines that the lane change has been finished, the lane which has been considered as the adjacent lane before the lane change is considered as the subject lane. Accordingly, along with this, the steering angle correcting unit 104 acquires, as the subject-lane slope, the slope information which has been acquired as the adjacent-lane slope and calculates the steering angle correction amount based on the subject-lane slope. Then, the steering angle correcting unit 104 corrects the target steering angle by adding the calculated steering angle correction amount to the target steering angle. Further, the steering angle correcting unit 104 may use the subject-lane slope not only when the determining unit 101 determines that the subject vehicle has finished changing lanes, but also when the lane which has been considered as the adjacent lane before the lane change is considered as the subject lane.

The steering control unit 105 performs the steering control such that the steering angle of the steering wheel of the subject vehicle follows the target steering angle calculated by the steering angle calculating unit 103. Further, when the target steering angle is corrected by the steering angle correcting unit 104, the steering control unit 105 performs the steering control such that the steering angle of the steering wheel of the subject vehicle follows the corrected target steering angle. Specifically, the steering control unit 105 outputs a steering control instruction to the drive control device 18 to cause the steering angle of the steering wheel of the subject vehicle to follow the target steering angle.

Further, in this embodiment, the steering control unit 105 may execute, as feedforward control, traveling control based on the target steering angle corrected by the steering angle correcting unit 104 and may execute feedback control over the lateral deviation with respect to the target travel trajectory of the subject vehicle, which is caused by a difference between the slope of the road surface in the width direction of the lane acquired from the map database 13 and an actual slope of the road surface in the width direction of the lane. In the feedforward control in this embodiment, the steering angle correction amount is calculated based on the slope information acquired from the map database 13, and the target steering angle is corrected using the calculated steering angle correction amount. Accordingly, when there is a difference between the slope information acquired from the map database 13 and the actual slope information of the road surface in the width direction of the lane, after the feedforward control, the lateral deviation with respect to the target travel trajectory of the subject vehicle, which is caused by the difference, may remain in some cases. The steering control unit 105 corrects the lateral deviation through the feedback control.

Figure 2:
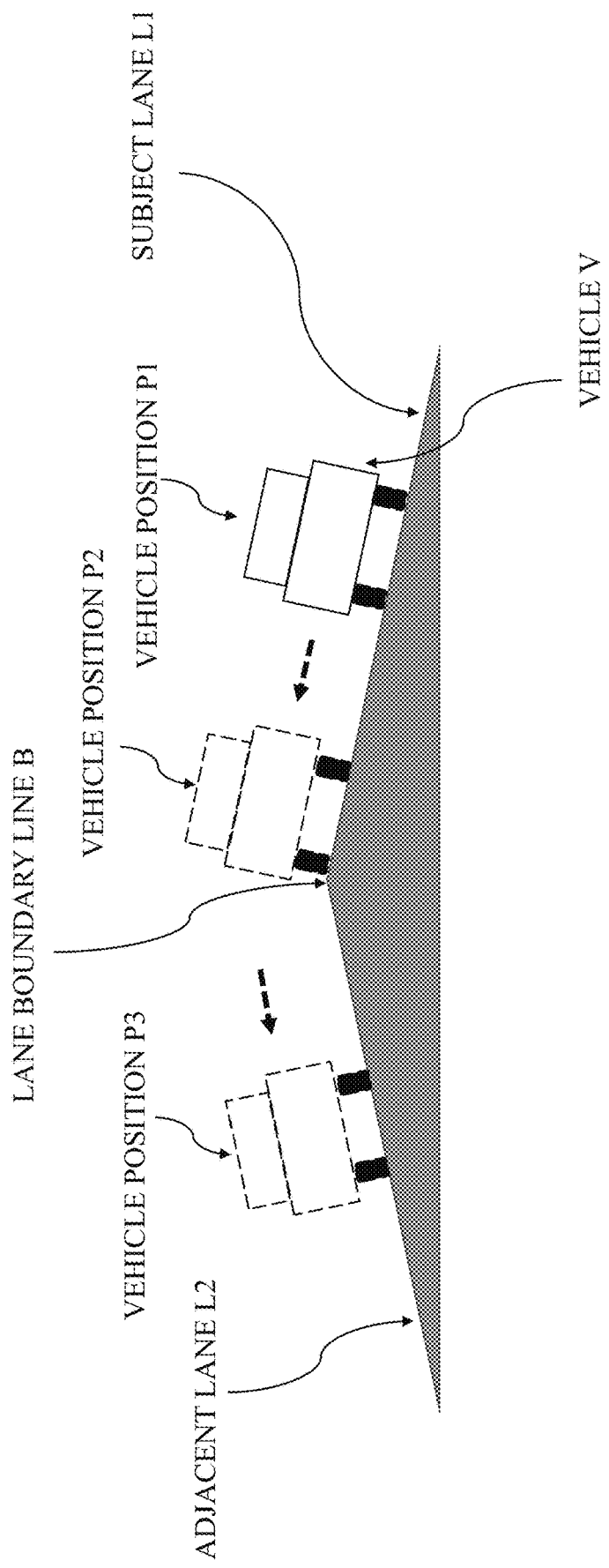
FIG. 2 is a view illustrating a scene of a lane change between lanes which differ in a slope of a road surface in a width direction.

FIG. 2 is a view illustrating a scene of a lane change between lanes which differ in slope. With reference to FIG. 2, description is given of an example to which the vehicle control method according to this embodiment is applied. FIG. 2 illustrates a scene in which a vehicle V changes lanes from a subject lane L1 to an adjacent lane L2. In FIG. 2, a depth direction of the drawing sheet corresponds to the traveling direction of the vehicle V, and the vehicle V starts changing lanes from a vehicle position P1 on the subject lane L1 in a leftward direction with respect to the traveling direction. When the lane change is started, the lateral position of the vehicle V is moved upward along the subject-lane slope, and the vehicle edge of the vehicle V reaches the lane boundary line B at a vehicle position P2. Moreover, the lateral position of the vehicle V is moved downward along the adjacent-lane slope, and is moved to a vehicle position P3. When the vehicle V has moved to the vehicle position P3, the lane change is finished. In the scene of the lane change as illustrated in FIG. 2, when the vehicle edge of the vehicle V (for example, a wheel on the adjacent lane side) is shifted from the subject lane to the adjacent lane, the slope of the road surface in the width direction of the lane, in which the vehicle V is traveling, changes.

In the vehicle control method according to this embodiment, at the time when the vehicle V is traveling in the subject lane L1, the target steering angle is corrected using the slope information of the adjacent lane L2 being the lane change destination. In other words, according to the vehicle control method in this embodiment, before the slope of the lane changes, the target steering angle is corrected using the subject-lane slope before the change and the adjacent-lane slope after the change, and hence it is possible to perform the steering control suited to the adjacent-lane slope of the adjacent lane L2 after the change even when the slope of the road surface in the width direction of the lane changes during the lane change. Thus, in this embodiment, as compared to a case of performing the steering control suited to the slope of the road surface in the width direction of the subject lane, it is possible to suppress the lateral deviation with respect to the target travel trajectory of the subject vehicle, which is caused due to the change in slope between the lanes. Therefore, the vehicle control device according to this embodiment can stably execute the steering control of the subject vehicle and improves ride quality of the subject vehicle.

Figure 3:
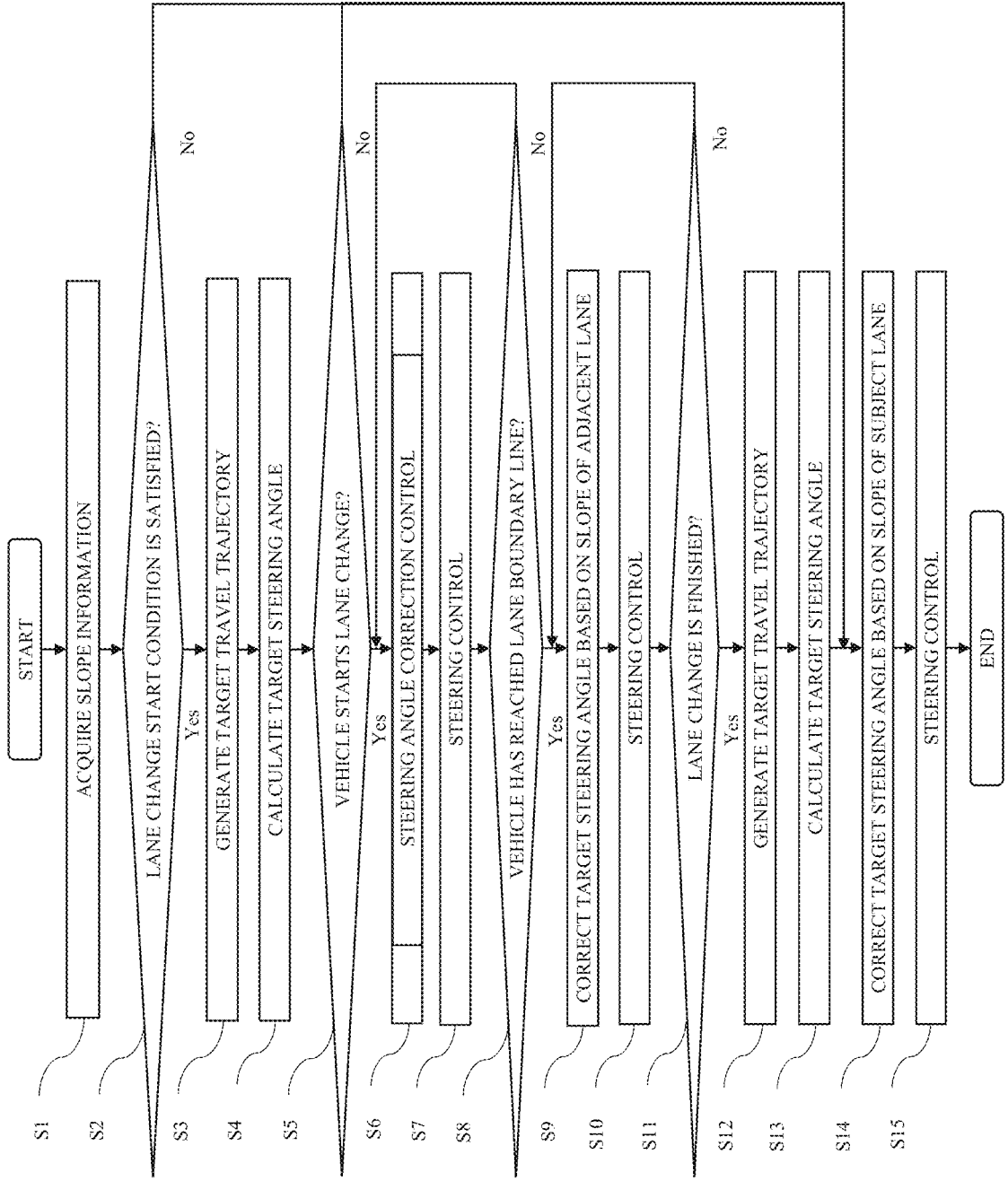
FIG. 3 is a flowchart illustrating a process of vehicle control according to the embodiment of the present invention.

Next, with reference to a flowchart of FIG. 3, description is given of a process for performing the vehicle control according to this embodiment. FIG. 3 is a flowchart illustrating the process of the vehicle control according to this embodiment. In this embodiment, when the subject vehicle starts traveling, the control device 19 starts a flow of the process from Step S1. For example, the following situation is assumed: the target travel trajectory for the travel of the subject vehicle is set; the target steering angle is set such that the subject vehicle travels along the target travel trajectory; and the subject vehicle starts traveling along the target travel trajectory. In Step S1, the control device 19 acquires, during the travel, the slope information relating to the subject-lane slope of the subject lane in which the subject vehicle is traveling and to the adjacent-lane slope of the adjacent lane adjacent to the subject lane. For example, the control device 19 acquires each slope information using the map information stored in the map database 13. In Step S2, the control device 19 determines whether or not the lane change start condition is satisfied. For example, the control device 19 determines whether or not the lane change start condition is satisfied depending on whether or not the adjacent lane has a space allowing the lane change based on the detection results that the sensor 11 detects the obstacles on the adjacent lane being the lane change destination.

When the control device 19 determines that the lane change start condition is satisfied, the control device 19 proceeds to Step S3. When the control device 19 does not determine that the lane change start condition is satisfied, the control device 19 proceeds Step S14. In this embodiment, when the subject vehicle does not change lanes, the control device 19 corrects the target steering angle using the subject-lane slope without use of the adjacent-lane slope. In Step S3, the control device 19 generates the target travel trajectory for the lane change. In Step S4, the control device 19 calculates a target control amount including the target steering angle such that the subject vehicle follows the target travel trajectory generated in Step S3. When the target control amount including the target steering angle is calculated, the control device 19 outputs the target control amount including the target steering angle to the drive control device 18.

In Step S5, the control device 19 determines whether or not the subject vehicle starts changing lanes. For example, the control device 19 determines whether or not the subject vehicle has started changing lanes depending on whether or not the subject vehicle has started moving in a lateral direction to change lanes, in other words, whether or not the lateral position of the subject vehicle has been started to move along the target travel trajectory for the lane change. When the control device 19 determines that the subject vehicle starts changing lanes, the process proceeds to Step S6. When the control device 19 does not determine that the lane change is started, the process proceeds to Step S14. In Step S6, the control device 19 performs the steering angle correction control to correct the target steering angle. The specific process of the steering angle correction control is described later with reference to FIG. 4. In Step S7, the control device 19 performs the steering control of the subject vehicle. Specifically, the control device 19 outputs the steering control instruction to the drive control device 18 such that the steering angle of the steering wheel of the subject vehicle follows the target steering angle corrected in Step S6. The drive control device 18 controls the operation of the steering actuator based on the steering control instruction.

In Step S8, the control device 19 determines whether or not the vehicle edge of the subject vehicle has reached the lane boundary line. When the control device 19 determines that the vehicle edge of the subject vehicle has reached the lane boundary line, the process proceeds to Step S9. When the control device 19 does not determine that the vehicle edge of the subject vehicle has reached the lane boundary line, the process returns to Step S6, and the control device 19 repeats the processing of Step S6 to Step S8 until an affirmative determination is made in Step S8. In Step S9, the control device 19 corrects the target steering angle based on the adjacent-lane slope. In Step S10, the control device 19 performs the steering control such that the steering angle of the steering wheel of the subject vehicle follows the target steering angle corrected in Step S9.

In Step S11, the control device 19 determines whether or not the lane change has been finished. For example, the control device 19 determines whether or not the subject vehicle has finished the lane change to the adjacent lane based on whether or not the lateral position of the subject vehicle has reached the center line in the width direction of the adjacent lane being the lane change destination. When the control device 19 determines that the lane change has been finished, the process proceeds to Step S12. When the control device 19 does not determine that the lane change has been finished, the process returns to Step S9, and the control device 19 repeats the processing of Step S9 to Step S11 until an affirmative determination is made in Step S11. In Step S12, the control device 19 has determined that the lane change is finished, and hence the control device 19 generates the target travel trajectory along the subject lane by considering the lane, which has been considered as the adjacent lane before the lane change, as the subject lane. In Step S12 to Step S15 subsequent to Step 11, the control device 19 considers the lane, which has been considered as the adjacent lane before the lane change, as the subject lane. In Step S13, the control device 19 calculates the target steering angle such that the vehicle travels along the target travel trajectory generated in Step S12. In Step S14, the control device 19 corrects, based on the subject-lane slope, the target steering angle calculated in Step S13. In Step S15, the control device 19 performs the steering control such that the steering angle of the steering wheel of the subject vehicle follows the target steering angle corrected in Step S14.

Figure 4:
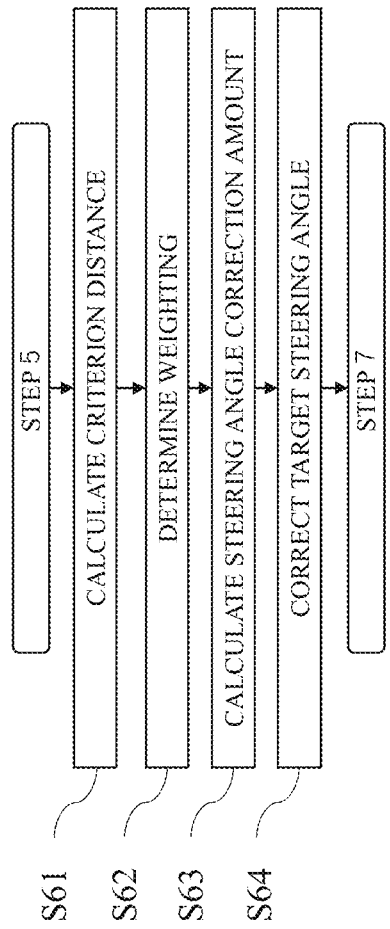
FIG. 4 is a flowchart illustrating a subroutine of Step 6 illustrated in FIG. 3.

Next, with reference to a flowchart of FIG. 4, a subroutine of the steering angle correction control in this embodiment is described. FIG. 4 is a flowchart illustrating the subroutine of the steering angle correction control in Step S6 illustrated in FIG. 3. When the control device 19 determines in Step S5 of FIG. 3 that the subject vehicle starts changing lanes, the control device 19 first proceeds to Step S61. In Step S61, the control device 19 calculates the criterion distance from the subject vehicle to the lane boundary line between the subject lane and the adjacent lane. In Step S62, the control device 19 determines, in accordance with the criterion distance calculated in Step S61, weighting of each of the subject-lane slope and the adjacent-lane slope which are acquired in Step S1 of FIG. 3. For example, as the criterion distance becomes smaller, in other words, as the vehicle is closer to the lane boundary line, the control device 19 sets weighting of the subject-lane slope to a smaller value and sets weighting of the adjacent-lane slope to a larger value. In Step S63, the control device 19 calculates the steering angle correction amount for correcting the target steering angle calculated in Step S4 of FIG. 3. For example, the control device 19 calculates the weighted slope by weighting the subject-lane slope and the adjacent-lane slope and calculates the steering angle correction amount based on the weighted slope. In Step S64, the control device 19 corrects the target steering angle by adding the steering angle correction amount calculated in Step S63 to the target steering angle. When the target steering angle is corrected in Step S64, the process exits from the subroutine illustrated in FIG. 4 and proceeds to Step S7 of FIG. 3.

As described above, in this embodiment, the control device 19 calculates the target steering angle of the steering wheel of the subject vehicle such that the subject vehicle follows the target travel trajectory for the lane change, corrects the target steering angle based on the subject-lane slope representing the slope of the road surface in the width direction of the subject lane in which the subject vehicle is traveling and the adjacent-lane slope representing the slope of the road surface in the width direction of the adjacent lane being the lane change destination of the subject vehicle, and performs the steering control such that the steering angle of the steering wheel follows the corrected target steering angle. Thus, even when the slope in the width direction differs between the subject lane and the adjacent lane being the lane change destination, it is possible to suppress the lateral deviation with respect to the target travel trajectory of the subject vehicle, which is caused due to the difference in slope between lanes during the lane change.

Further, in this embodiment, the control device 19 calculates the criterion distance from the subject vehicle to the lane boundary line between the subject lane and the adjacent lane at predetermined time intervals, determines weighting of each of the subject-lane slope and the adjacent-lane slope based on the calculated criterion distance, and corrects the target steering angle based on the weighted subject-lane slope and the weighted adjacent-lane slope. Thus, weighting of the slope of the subject lane and weighting of the slope of the adjacent lane change in accordance with the distance to the adjacent lane, and hence even when the slope in the width direction changes between the lanes, it is possible to suppress the lateral deviation with respect to the target travel trajectory of the subject vehicle, which is caused during the change.

Further, in this embodiment, the control device 19 acquires information of the subject-lane slope and the adjacent-lane slope using the map information. Thus, not only the slope of the lane in which the subject vehicle is actually traveling, but also the slope of the adjacent lane can be acquired in advance before a travel in the adjacent lane.

Further, in this embodiment, the control device 19 calculates the criterion distance at predetermined time intervals from the time when the subject vehicle starts moving in the lateral direction to change lanes. Thus, the steering angle control can be performed in consideration of the slope of the adjacent lane from the time when the subject vehicle starts moving in the lateral direction to change lanes, and hence even when the slope of the lane in which the subject vehicle is traveling changes, it is possible to suppress the lateral deviation with respect to the target travel trajectory of the subject vehicle, which is caused during the change.

Further, in this embodiment, the control device 19 determines whether or not the subject vehicle has finished changing lanes. When the control device 19 determines that the subject vehicle has finished changing lanes, the control device 19 calculates the target steering angle such that the subject vehicle follows the target travel trajectory along the lane which has been considered as the adjacent lane before the lane change, and corrects the target steering angle based on the slope of the road surface in the width direction of the lane which has been considered as the adjacent lane before the lane change. Thus, after the lane change, it is possible to perform the steering angle control suited to the slope of the lane in which the subject vehicle is traveling.

The embodiment heretofore explained is described to facilitate understanding of the present invention and is not described to limit the present invention. It is therefore intended that the elements disclosed in the above embodiment include all design changes and equivalents to fall within the technical scope of the present invention.

For example, in this embodiment, description is given of correcting the target steering angle using the subject-lane slope and the adjacent-lane slope during the lane change, but the present invention is not limited thereto. Even during the lane change, the target steering angle may be corrected using the adjacent-lane slope without use of the subject-lane slope when the subject lane has no slope of the road surface in the width direction, in other words, when the slope is zero. In this case, the control device 19 sets weighting of the adjacent-lane slope to a larger value as the criterion distance becomes smaller in accordance with the criterion distance between the subject vehicle and the lane boundary line, and the control device 19 calculates the steering angle correction amount based on the weighted adjacent-lane slope. Further, in this embodiment, even during the lane change, the target steering angle may be corrected using the subject-lane slope without use of the adjacent-lane slope when the adjacent lane has no slope of the road surface in the width direction, in other words, when the slope is zero. In this case, the control device 19 sets weighting of the subject-lane slope to a smaller value as the criterion distance becomes smaller in accordance with the criterion distance between the subject vehicle and the lane boundary line, and the control device 19 calculates the steering angle correction amount based on the weighted subject-lane slope.

DESCRIPTION OF REFERENCE NUMERALS

- 1 . . . vehicle control device
- 11 . . . sensor
- 12 . . . subject vehicle position detection device
- 13 . . . map database
- 18 . . . drive control device
- 19 . . . control device
- 100 . . . slope information acquiring unit
- 101 . . . determining unit
- 102 . . . travel trajectory generating unit
- 103 . . . steering angle calculating unit
- 104 . . . steering angle correcting unit
- 105 . . . steering control unit

The invention claimed is:

1. A vehicle control method to be executed by a controller, wherein the controller is configured to:
    calculate a target steering angle of a steering wheel of a subject vehicle such that the subject vehicle follows a target travel trajectory for a lane change;
    correct, before the subject vehicle enters an adjacent lane being a lane change destination of the subject vehicle, the target steering angle using an adjacent-lane slope representing a slope of a road surface in a width direction of the adjacent lane in addition to a subject-lane slope representing a slope of a road surface in a width direction of a subject lane in which the subject vehicle is traveling; and
    perform steering control such that a steering angle of the steering wheel follows the corrected target steering angle.

2. The vehicle control method according to claim 1, wherein the controller is configured to:
    calculate a criterion distance from the subject vehicle to a lane boundary line between the subject lane and the adjacent lane at predetermined time intervals;
    determine weighting of each of the subject-lane slope and the adjacent-lane slope in accordance with the calculated criterion distance; and
    correct the target steering angle based on the weighted subject-lane slope and the weighted adjacent-lane slope.

3. The vehicle control method according to claim 1, wherein the controller is configured to acquire information of the subject-lane slope and the adjacent-lane slope using map information.

4. The vehicle control method according to claim 2, wherein the controller is configured to calculate the criterion distance at the predetermined time intervals from a time when the subject vehicle starts moving in a lateral direction for the lane change.

5. The vehicle control method according to claim 1, wherein the controller is configured to:
    determine whether or not the subject vehicle has finished the lane change;
    when determining that the subject vehicle has finished the lane change, calculate the target steering angle such that the subject vehicle follows the target travel trajectory along a lane which has been considered as the adjacent lane before the lane change; and
    correct the target steering angle based on a slope of a road surface in a width direction of the lane which has been considered as the adjacent lane before the lane change.

6. A vehicle control device comprising:
    a steering angle calculating unit configured to calculate a target steering angle of a steering wheel of a subject vehicle such that the subject vehicle follows a travel trajectory for a lane change;
    a steering angle correcting unit configured to correct, before the subject vehicle enters an adjacent lane being a lane change destination of the subject vehicle, the target steering angle using an adjacent-lane slope representing a slope of a road surface in a width direction of the adjacent lane in addition to a subject-lane slope representing a slope of a road surface in a width direction of a subject lane in which the subject vehicle is traveling; and
    a steering control unit configured to perform steering control such that a steering angle of the steering wheel follows the corrected target steering angle.

* * * * *